United States Patent [19]

Berry

[11] 4,249,353
[45] Feb. 10, 1981

[54] FIRE BARRIER ASSEMBLY FOR ELECTRICAL CABLE

[75] Inventor: Richard C. Berry, Camillus, N.Y.

[73] Assignee: Crouse-Hinds Company, Syracuse, N.Y.

[21] Appl. No.: 15,842

[22] Filed: Feb. 27, 1979

[51] Int. Cl.³ .............................................. E04C 2/52
[52] U.S. Cl. ..................................... 52/232; 285/189; 428/921; 174/151; 248/56
[58] Field of Search .................... 52/232, 221; 248/56, 248/68 CB; 174/151, 23 R; 285/189, 192, 196, 159; 137/357, 360; 428/921

[56] References Cited

U.S. PATENT DOCUMENTS

| | | | |
|---|---|---|---|
| 1,851,940 | 3/1932 | Williams | 285/139 |
| 2,732,226 | 1/1956 | Brattberg | 248/56 |
| 3,336,153 | 8/1967 | Juda | 428/355 |
| 3,783,543 | 1/1974 | Hemgren | 52/656 |
| 3,864,883 | 2/1975 | McMarlin | 52/221 |
| 3,976,825 | 8/1976 | Anderberg | 174/151 |
| 4,018,983 | 4/1977 | Pedlow | 428/921 |
| 4,061,344 | 12/1977 | Bradley | 285/196 |
| 4,086,736 | 5/1978 | Landrigan | 248/56 |

FOREIGN PATENT DOCUMENTS 2162251 6/1973 Fed. Rep. of Germany ............. 248/56

*Primary Examiner*—James L. Ridgill, Jr.
*Attorney, Agent, or Firm*—Sughrue, Rothwell, Mion, Zinn & Macpeak

[57] ABSTRACT

The fire barrier assembly is comprised of a frame through which one or more electrical cables may be passed and a plurality of sealing elements clamped in the frame in contact with each electrical cable and the frame to provide an airtight barrier. Each element has a plate-like configuration and is comprised of an elastomeric body having intumescent material mixed therewith and opposing end members connected by bolts so that upon movement of the end members toward each other the elastomeric body will expand into intimate engagement with adjacent elements, the frame and each cable passing through the frame. Adjacent elements on opposite sides of an electrical cable are provided with complimentary grooves to define a cylindrical passage for each cable and additional filler elements may be provided without grooves. An external coating of intumescent material is applied to the outer surfaces only of the frame and end members to provide a heat insulating layer.

7 Claims, 13 Drawing Figures

FIG.5a  FIG.5b  FIG.5c  FIG.5d  FIG.5e
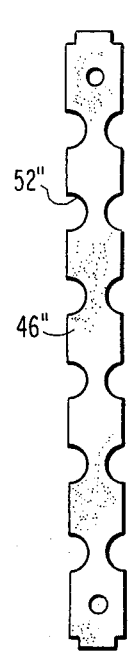
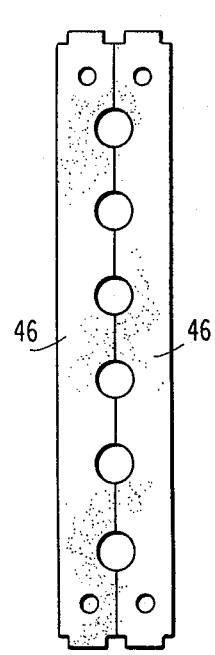
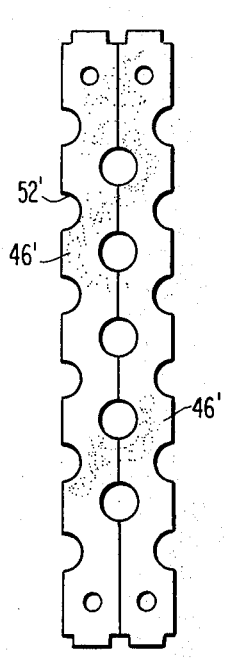
FIG.5f  FIG.5g  FIG.5h  FIG.5i
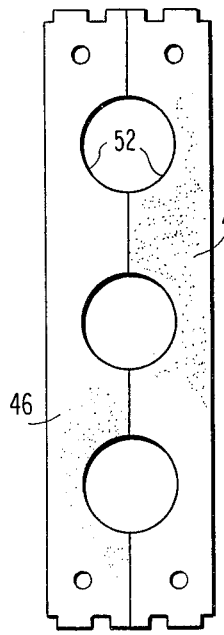
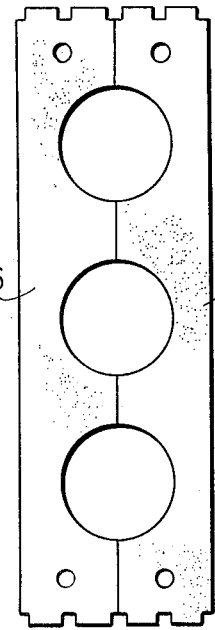
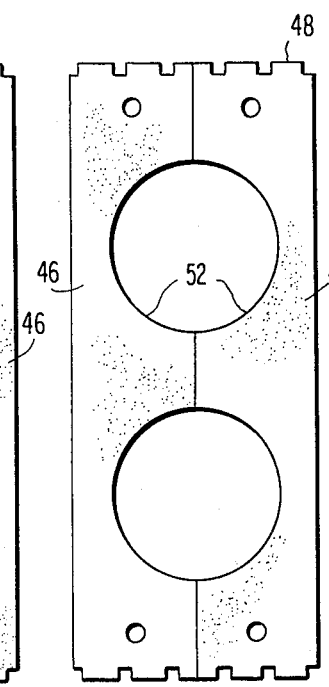
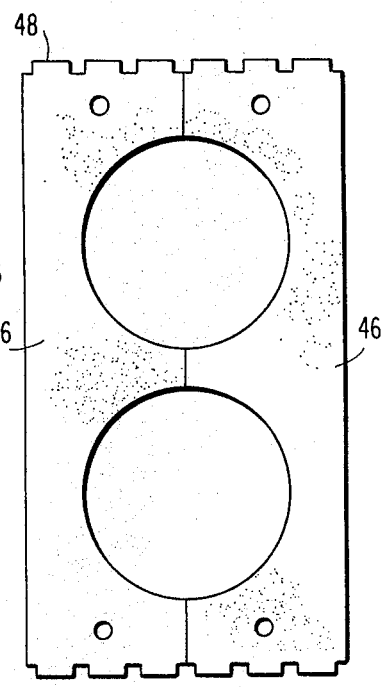

FIRE BARRIER ASSEMBLY FOR ELECTRICAL CABLE

BACKGROUND OF THE INVENTION

1. Field of the Invention

The present invention is directed to fire barrier assemblies for apertures through which one or more electrical cables may pass and more specifically, to a novel construction of the frame and sealing elements for achieving the fire barrier.

2. Prior Art

The U.S. Pat. No., to Williams, 1,851,940, discloses a closure for conduits and the like having electrical cables passing therethrough wherein a septum or plug comprised of one or more pieces of resilient material having cutout portions for receiving the cables, is inserted into the conduit in close fitting relation about the cables. A pair of end plates on opposite sides of the septum or plug are then bolted together and upon being drawn together will force the resilient material into close intimate engagement with the conduit wall and the external surface of the cables.

The U.S. Pat. No., to Brattberg, 2,732,226, is directed to a pressure-tight packing assembly for conductors passing through a wall. The pressure-tight packing assembly consists of a short, rectangular tube which is filled in part with elastic blocks of varying sizes. Adjacent blocks may be provided with comlimentary grooves which will define a cylindrical passage for a specific size electrical condutor and some blocks are provided without grooves to merely act as fillers. After the blocks and cables are all assembled in the desired relationship, a final pressure sealing may be obtained between the conductors, the elastic blocks and the tube by compressing the blocks in a direction perpendicular to the cables by means of a common plate. Suitable arrangements are then provided to fill the gap left between the opposite side of the plate and the tube.

The U.S. Pat. No., to Anderberg, 3,976,825, is directed to a lead through for electrical cables which will be fire proof, gas proof and liquid proof at a predetermined temperature. The cables extend through an opening in a ceiling, floor or wall and a pair of complimentary guide strips, each of which is provided with a semi-cylindrical groove, surround each cable. Interfitting filling members are also provided to completely fill the opening. There is no compression applied to the filling members, guide strips or cables so that each of these elements may readily be withdrawn from the opening in order to change the configuration and add or substract cables passing therethrough. The guide strips and filling members are composed of a material having a high coefficient of cubic expansion whereby in the event of fire, the guide means and filling members will expand to form a tight seal within the frame and against the cables. One end of the assembly may be coated with a material to seal the spaces between the guide strips and the cables in a gas tight and liquid proof manner.

The U.S. Pat. No., to Bradley et al, 4,061,344, is directed to a fitting for penetration through fire rated barriers to provide for the passage of pipes, cables, or conduits. According to one embodiment of this patent, a plurality of layers or plates of intumescent material are provided in alternating relationship with one or more layers or plates of an elastomeric sealing material. A pair of rigid compression plates are provided on opposite sides of the assembly and are adjustably secured together by means of bolts extending through the assembly. One or more apertures may be provided through the plurality of layers or plates for the passage of a cable or the like. The rigid compression plates may be coated with an intumescent material and upon drawing the rigid compression plates together, the elastomeric plates will be expanded to closely grip the walls of the opening and the cables passing therethrough. The elastomeric material provides a gas and liquid seal at normal temperatures and upon being exposed to elevated temperatures, the intumescent material will expand to compensate for the destruction or shrinking of the elastomeric material and the insulation surrounding an electrical cable to maintain a tight seal between the opening and the conductor of the electrical cable. In another embodiment according to this patent, a single heterogeneous member comprising both the sealing material and the intumescent material is disposed between the two compression plates.

SUMMARY OF THE INVENTION

The present invention is directed to a new and improved fire barrier assembly for use with electrical cables or the like passing through an opening in a fire wall. A plurality of plate-like assemblies of varying thicknesses, each of which is comprised of a plate of elastomeric-intumescent material and a pair of compression plates disposed at opposite ends thereof which are interconnected by adjustable connecting means to vary the spacing between the compression plate are disposed in a rectilinear frame in side-by-side relation perpendicular to the fire wall. Each plate is slidably connected to the frame by a tongue and groove connection. At least one pair of plate-like members are provided with complimentary semi-cylindrical grooves so that upon location of said pair of plate-like assemblies in side-by-side relation within the frame, at least one cylindrical passage will be provided for the reception of a cable or the like therethrough. A plurality of cylindrical passages may be provided in said pair of plate-like members which are all of the same radius while other pairs of plate-like members may be provided with one or more cylindrical passages having different radii. Other plate-like members are provided with semi-cylindrical grooves on opposite faces thereof and still other plate-like members which act as filler members are not provided with any grooves.

Upon completely filling the rectinlinear frame with plate-like assemblies with one or more cables or the like disposed in respective passages, the connecting means between the end plates are adjusted to draw each pair of end plate towards each other so as to expand the elastomeric-intumescent plate into sealing engagement with the frame, adjacent plates and cables or the like passing therethrough. It is also contemplated that the rectinlinear frame could be completely filled with a single plate-like assembly or a plurality of plate-like assemblies which are not provided with grooves to accomodate cables or the like. All of the end plates disposed on one side of the frame have a dimension which will prevent the entry of the plates into the frame whereas the end plates at the opposite end of each plate-like assembly are dimensioned such that they can be drawn into the frame. The exterior surfaces of the end plates and the frame are coated with an intumescent material to provide additional heat insulation.

The foregoing and other objects, features and advantages of the invention will be apparent from the following more particular description of a preferred embodiment of the invention as illustrated in the accompanying drawings.

BRIEF DESCRIPTION OF THE DRAWINGS

FIGS. 5A and 5B are end elevation views showing two different sizes of filler plates of elastomeric-intumescent material.

FIG. 5C is an end elevation view of an elastomeric-intumescent plate having semi-cylindrical grooves in opposite surfaces thereof.

FIGS. 5D-I are end elevation views of various sized pairs of elastomeric-intumescent material plates providing different diameter cylindrical passages.

DETAILED DESCRIPTION OF THE INVENTION

Figure 1:
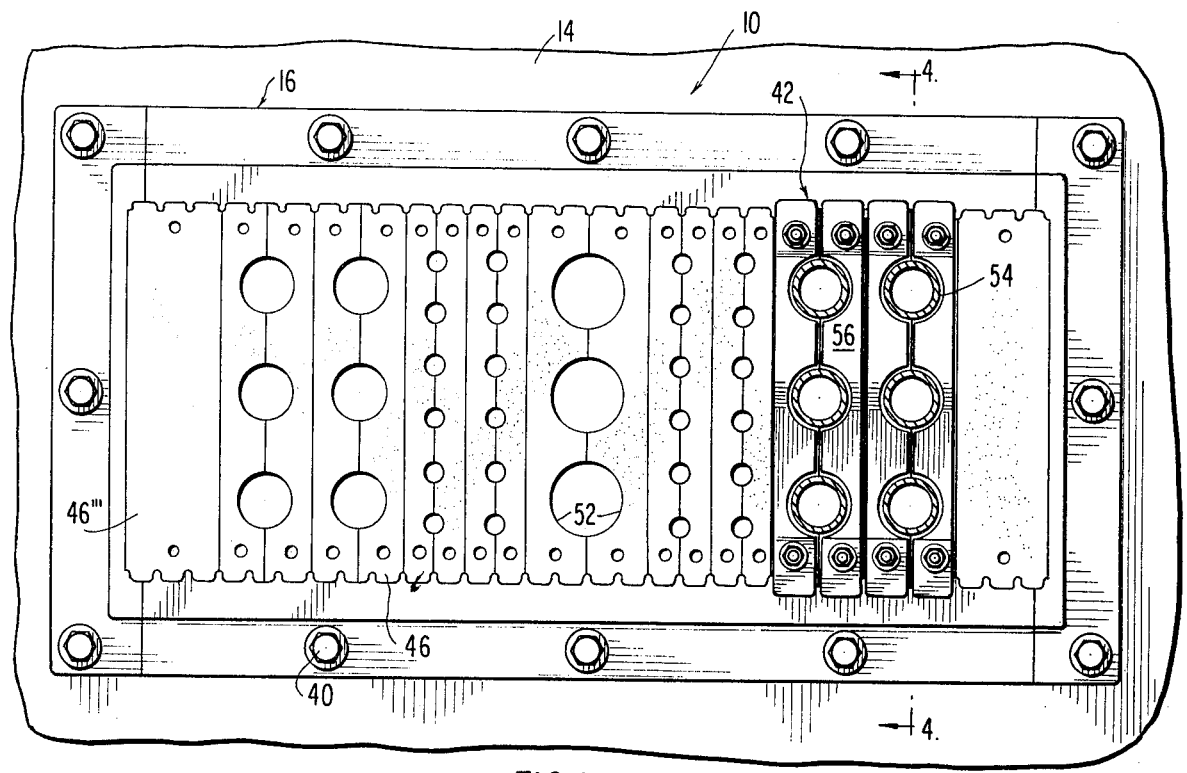
FIG. 1 is an end elevation view of a fire barrier assembly according to the present invention with some of the end plates removed.
Figure 2:
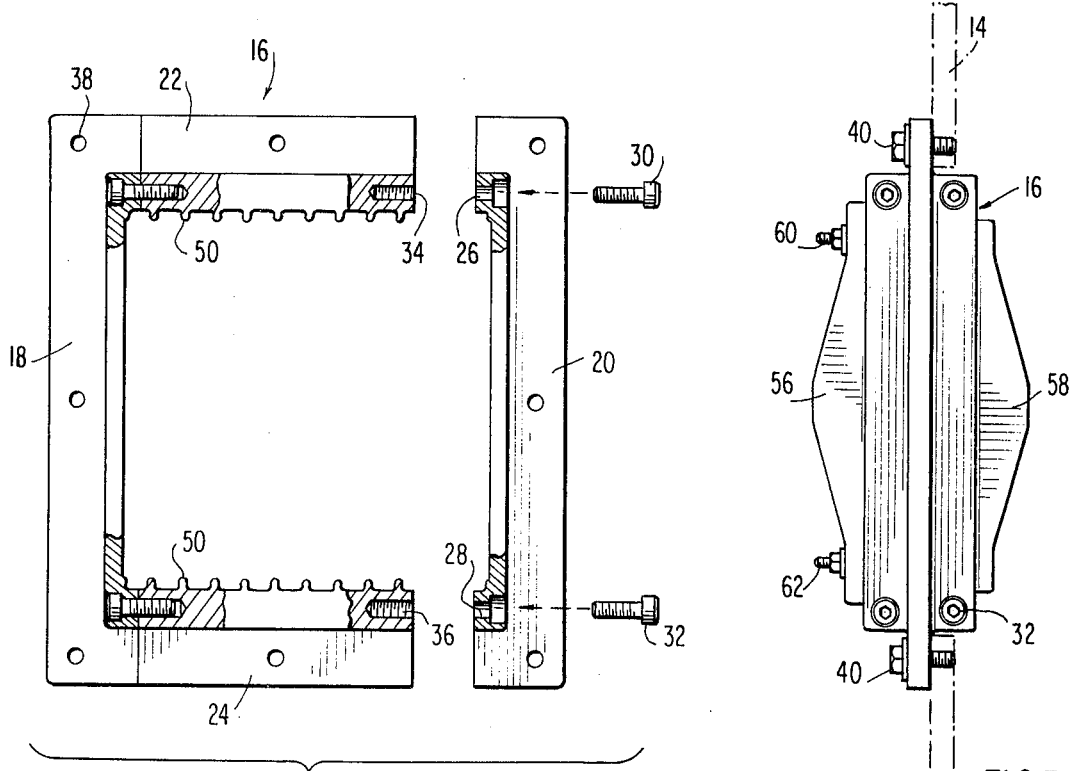
FIG. 2 is an exploded, partially sectioned end elevation view of the frame for the fire barrier assembly in partially assembled condition.
Figure 3:
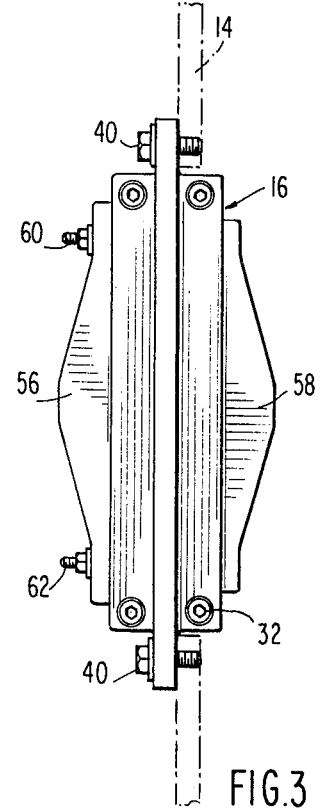
FIG. 3 is a side elevation view of the fire barrier assembly according to the present invention.

The fire barrier assembly 10 according to the present invention is adapted to be located in an opening 12 in a fire wall 14. The term fire wall includes ceilings, floors or any other structural element intended to act as a fire stop.

The fire barrier assembly 10 is comprised of a rectilinear frame 16 which may be constructed of any suitable size. In order to facilitate the construction of the frame in various sizes, the frame 16 is comprised of two end pieces 18 and 20 and two elongated side pieces 22 and 24. The end pieces 18 and 20 are provided with through passages 26 and 28 for the passage of bolts 30 and 32 which are threaded into engagement with threaded bores 34 and 36 to secure the end pieces to the elongated side pieces. The end pieces 18 and 20 are preferably of a single size whereas the side pieces 22 and 24 come in a variety of lengths to provide different size rectilinear frames. The plate-like assemblies which are adapted to be inserted into the frame are preferably of the same height but vary in thickness as will be described hereinafter. Thus, by utilizing side pieces 22 and 24 of different lengths, the number of plate-like assemblies which can be accomodated within the frame can be varied. A plurality of apertures 38 are provided in the peripherial flange of the frame 16 for the passage of bolts 40 to secure the frame 16 to the fire wall 14.

A plurality of plate-like assemblies 42 are adapted to be located in side-by-side relation within the aperture defined by the frame 16. While each of the plate-like assemblies 42 may vary in width as well as in the number and size of cable accomodating grooves, the construction of a representative plate assembly is best understood by reference to FIG. 4. Each plate-like assembly 42 is comprised of a plate or block 46 of an elastomeric-intumescent material, the composition of which will be described in greater detail hereinafter, which is provided with one or more ribs or projections 48 extending the length of the top and bottom surfaces of the plate 46. The width of each rib 48 is slightly less than the distance between the ribs 50 on the side members 22 and 24 to provide a tongue and groove connection for slidably supporting each of the plate-like assemblies 42 in the frame 16.

Figure 4:
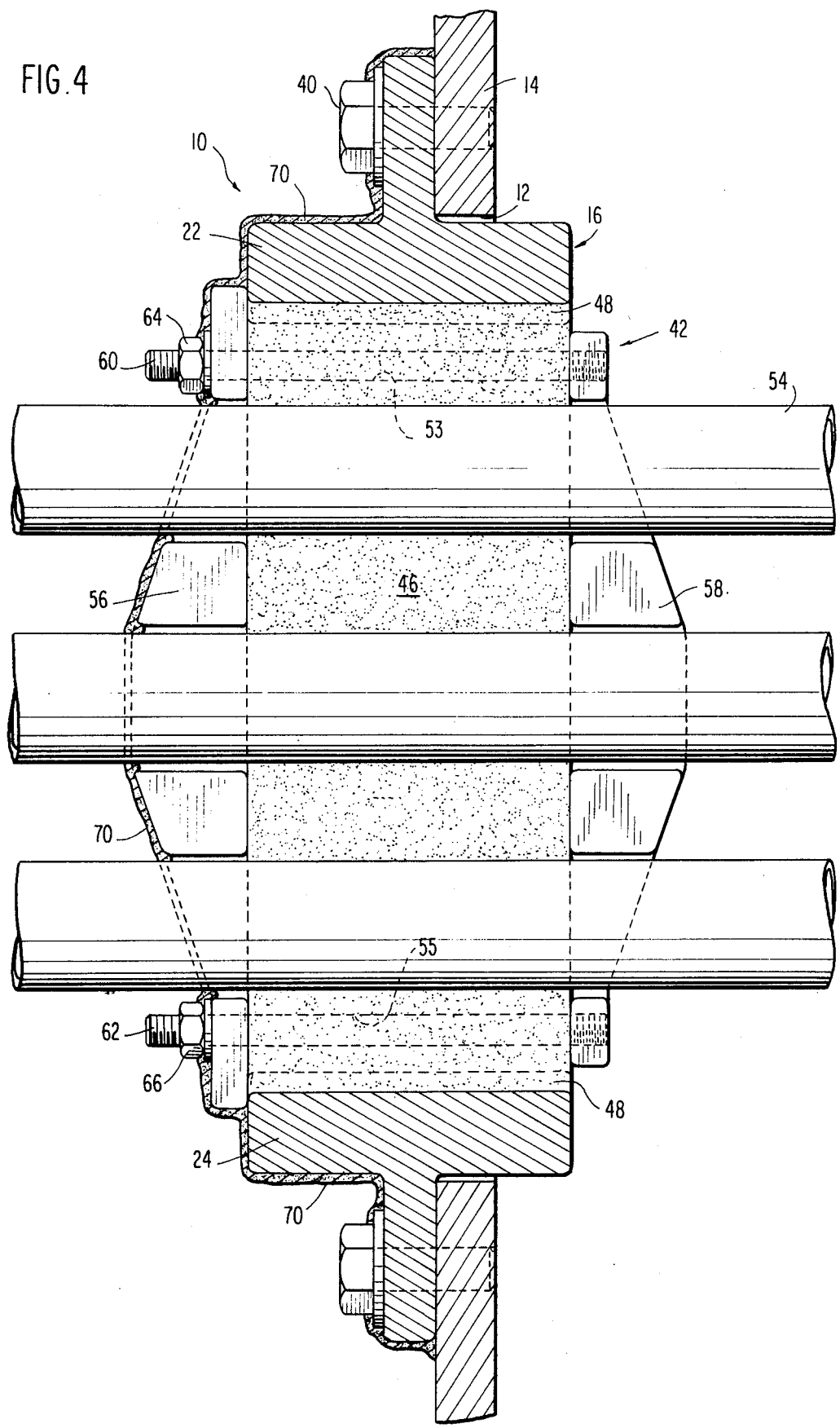
FIG. 4 is a sectional view taken along the line IV—IV of FIG. 1.

As best seen in FIGS. 1 and 5, the plates of elastomeric-intumescent material come in a wide variety of widths and may or may not be provided with semi-cylindrical grooves of varying sizes. The plates 46 such as shown in FIG. 4 and FIGS. 5D, F, G, H and I are provided with a plurality of longitudinally extending parallel semi-cylindrical grooves 52 in only one side surface of the plate. When two of these plates are disposed adjacent each other in the frame 16, the semi-cylindrical grooves will define a plurality of cylindrical passages extending entirely through the frame. Such cylindrical passages are adapted to receive electrical cables 54 as shown in FIG. 4 which have a diameter substantially equal to the diameter of the cylindrical passage. The plates 46 may be fitted about the cables prior to insertion into the frame or the cables may be fed through the cylindrical passages after the plates are located in the frame 16. The latter procedure would be much more difficult due to frictional forces and assembly prior to insertion into the frame would be the preferred method. The number of grooves in each plate and the thickness of the plate will vary depending upon the diameter of the grooves formed in the plate. The thicker plates have more than one rib 48 on the top and bottom surfaces so that all of the spaces between the ribs 50 on the frame will be filled. The plates 46' as shown in FIG. 5E, have a large number of smaller diameter grooves 52' and therefore the grooves may be located in opposite side faces of the plate in staggered relationship. The plate 46" as shown in FIG. 5C, also shows a plurality of small diameter grooves 52" located in opposite side faces of the plate with the grooves disposed directly opposite each other. This, of course, can only take place for the very smallest groove diameters so that sufficient material will be disposed between the opposed grooves. The plates 46''' as shown in FIGS. 5A and B are not provided with any grooves and act as filler plates. Thus, depending upon the number and size of the cables passing through the frame 16, various combinations of plates can be assembled as shown in FIG. 1. While only six electrical conduits 54 are shown in the cylindrical passages of FIG. 1, it is obvious that the other cylindrical passages defined by the semi-cylindrical grooves 52 would also have electrical conduits, electrical cables or the like passing therethrough. In those instances where two adjacent plates define a plurality of cylindrical passages and there are not enough cables or conduits to fill all of the passages, a cylindrical filler plug of the same material as the plates 46 could be inserted in the passage.

Once the assembly of elastomeric-intumescent plates, cables, conduits and the like are assembled in the frame to completely fill the same, it is necessary to apply pressure to the opposite surfaces of the assembly in order to compress the elastomeric-intumescent material into close intimate engagement with the frame, each other and the cables, conduits or the like passing therethrough. In order to accomplish this, each plate-like assembly 42 is provided with a pair of end compression plates 56 and 58 disposed on opposite ends thereof. Each plate of elastomeric-intumescent material, whether it be a grooved plate or a filler plate, is provided with two through bores 53 and 55. As best shown in FIG. 4, a pair of bolts 60 and 62 are non-rotatably secured to the top and bottom ends of the compression plate 58 and extend through the passages 53 and 55 and through corresponding apertures in the ends of the compression plate 56 and nuts 64 and 66 are threaded on the protruding ends of the bolts 60 and 62. Each plate 56 has a vertical dimension greater than the vertical dimension of the opening in the frame 16 as best shown in FIGS. 1 and 4 so that each compression plate will abut against the outer surface of the side members 22 and 24 of the frame 16. On the other hand, the vertical dimensions of the plate 58 are less than the distance between opposed ribs 50 on the top and bottom members 22 and 24 of the frame 16 so that a compression plate 58 can be drawn within the frame 16. The end compression plates 56 and 58 are preferably assembled in combination with the respective elastomeric-intumescent plate 46 prior to insertion into the frame 16. However, the nuts 64 and 66 are backed off to an extent so that the plate 46 is not under any compression.

After the rectilinear opening in the frame 16 is completely filled with plate-like assemblies 42, the nuts 64 and 66 on each assembly 42 will be tightened down an equal amount to draw the compression plates 58 toward the compression plates 56 and compress the elastomeric-intumescent material of the plates 46 into tight sealing engagement with the adjacent plates, the frame and the conduits or the like passing therebetween. Substantially equal compression can be applied to each plate-like assembly 42 by turning the nuts 64 and 66 until the ends of the bolts 60 and 62 all protrude an equal amount.

During construction of a building or the like in which the fire barrier assembly is to be located, the various cables would be run through the opened frame until such time as the construction work neared completion. At that time, the cables, conduits or the like could be assembled with the plate-like assemblies 42 within the opening of the frame 16. Pressure would not be applied to the plates until such time as the job was completely finished so that last minute changes could easily be accomplished by simply withdrawing the necessary plate assemblies 42, removing cables or running additional cables and reassemblying the proper plate assemblies 42.

As previously stated, the various plates 46 are constructed of an elastomeric-intumescent material. This material is preferably a combination of neoprene rubber and a filler of natural whiting ($CaCO_3$). When the neoprene is oxidized with heat or burned, it generates hydrogen chloride which, with water, forms hydrochloric acid. The natural whiting filler reacts with the hydrochloric acid to neutralize it, forming calcium chloride and carbon dioxide. Calcium chloride is highly deliquescent and the carbon dioxide gas that is formed expands with heat, thereby expanding the rubber.

Under ordinary conditions, the elastomeric-intumescent material composition according to the present invention will provide an air-tight barrier when compressed to prevent the passage of smoke or other vapors. Should a fire occur causing the destruction of the insulating material around an electrical conductor passing through the fire barrier, the expansion of the neoprene rubber will apply radial pressure on the electrical cable expelling the melting wire insulation and clamping the conductors into a tight bundle of copper, preventing the passage of any gas or flame from the fire to the cold side of the unit. In order to further enhance the efficiency of the fire barrier assembly, the external surfaces of the frame and compression plates can be coated with a layer of intumescent material 70. As shown in FIG. 4, the material 70 was applied to the external surfaces of the frame 16 and the compression plate 50 subsequent to their assembly. However, it is fully contemplated by the present invention that a similar coating of intumescent material could be located on the exposed surfaces of the frame 16 and compression plate 58 on the other side of the wall 14 in the same manner as shown. Rather than apply the intumescent material after the plate assemblies 42 are assembled in the frame and the frame is attached to the wall, the surfaces of the frame 16 and the surfaces of the compression plates 56 and 58 which would subsequently be exposed after assembly, could be precoated prior to assembly so that in situ coating step could be eliminated. It is also contemplated that the material 70 could be eliminated entirely.

The construction shown and described could also be used as a simple vapor barrier, watertight barrier, or dirt and dust-proof barrier without any modifications. In those instances where the possibility of intense heat is not a factor, any suitable elastomeric material without an intumescent filler could be utilized.

While the invention has been particularly shown and described with reference to preferred embodiments thereof, it will be understood by those in the art that the foregoing and other changes in form and details may be made therein without departing from the spirit and scope of the invention.

What is claimed is:

1. A barrier assembly comprising frame means having a substantially rectilinear opening extending therethrough and a plurality of plate assemblies removably disposed in said frame means parallel to each other; each plate assembly being comprised of a resilient plate, a compression plate on each end of said resilient plate, adjustable connecting means connecting said plates together for movement toward and away from each other, at least one pair of ribs disposed along opposed edges of said resilient plate between said compression plates and a plurality of spaced apart ribs disposed on opposed surfaces of said opening for the reception of the ribs on said plate assemblies therebetween.

2. A barrier assembly as set forth in claim 1, wherein at least one pair of adjacent plate assemblies each have complimentary grooves in contiguous surfaces to define a passage through said frame for the reception of an elongated element such as a conduit or electrical cable.

3. A barrier assembly as set forth in claim 1, wherein one of said compression plates extends beyond said ribs on the opposed edges of said resilient plate for engagement with one side of said frame means and the other of said compression plates has a height less than the distance between the bottom of said pair of ribs on said opposed edges of said resilient plate.

4. A barrier assembly as set forth in claim 1, wherein each resilient plate is comprised of an elastomeric-intumescent composition which will expand upon being subjected to excessive heat.

5. A barrier assembly as set forth in claim 1, wherein said frame means is comprised of a pair of opposed U-shaped end pieces and a pair of elongated side pieces extending between the opposed legs of said U-shaped end pieces and means detachably securing said end pieces and said side pieces together whereby different length side pieces may readily be substituted.

6. A barrier assembly as set forth in claim 1, further comprising intumescent coating means on the surfaces of said frame means and said plate assembly which are adapted to be exposed after said plate assemblies are secured in said frame means.

7. A barrier assembly as set forth in claim 1, wherein one of said plate assemblies is provided with smooth sides to act as a filler member within said opening.

* * * * *